W. E. SANDERSON.
HOSE COUPLING.
APPLICATION FILED JULY 7, 1919.
1,360,588.
Patented Nov. 30, 1920.
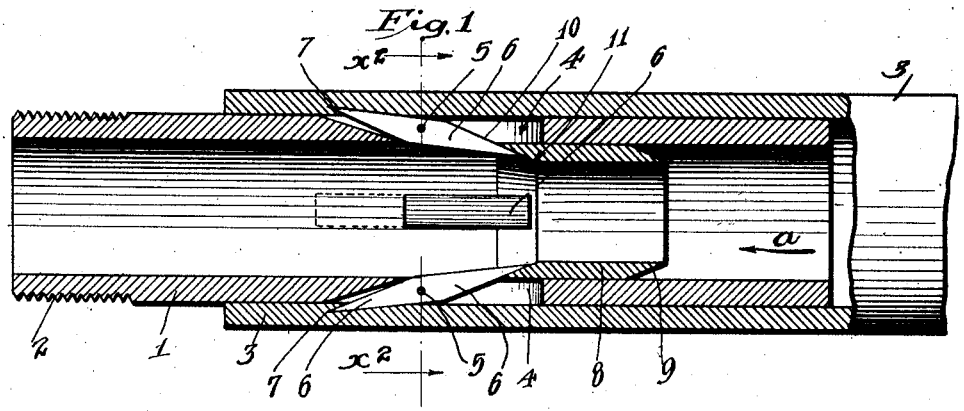
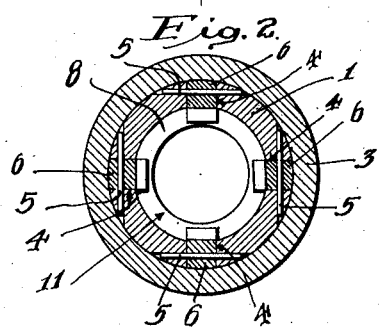
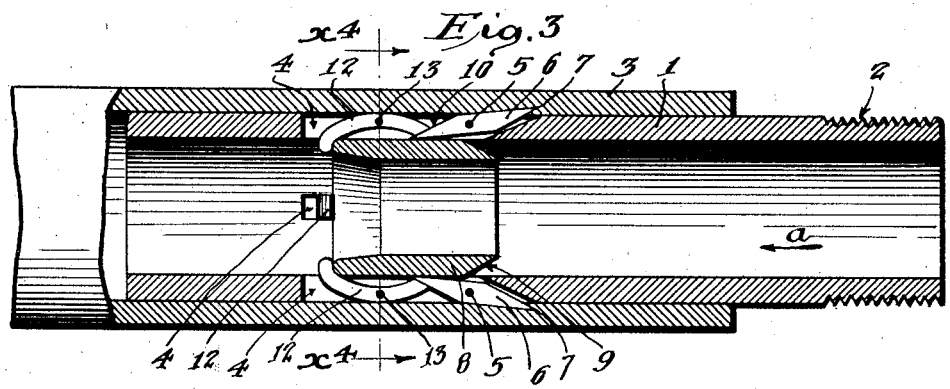
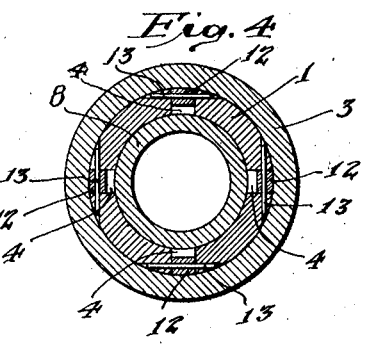
WITNESS
INVENTOR
William E. Sanderson
BY
ATTORNEY

UNITED STATES PATENT OFFICE.

WILLIAM E. SANDERSON, OF LOS ANGELES, CALIFORNIA.

HOSE-COUPLING.

1,360,588.   Specification of Letters Patent.   Patented Nov. 30, 1920.

Application filed July 7, 1919. Serial No. 309,196.

*To all whom it may concern:*

Be it known that I, WILLIAM E. SANDERSON, a citizen of the United States, residing at Los Angeles, in the county of Los Angeles and State of California, have invented a new and useful Hose-Coupling, of which the following is a specification.

This invention relates to couplings or connections for connecting hose to pipes, pneumatic tools and the like, and an object of the invention, in general, is to produce a coupling which cannot be accidentally disconnected by the pressure of the fluid in the hose.

Another object is to so construct the coupling that the pressure of the fluid is utilized to force the hose-engaging members into hose-engaging position and to maintain them in such position.

Another object is to produce a coupling of comparatively low manufacturing cost and one that is reliable in operation.

Other objects and advantages will appear in the subjoined detailed description.

The accompanying drawings illustrate the invention:

Figure 1 is a longitudinal mid section of a coupling embodying the invention, a fragment of hose also being shown and said hose being partly in section.

Fig. 2 is a sectional elevation on line indicated by $x^2$—$x^2$, Fig. 1.

Fig. 3 is a longitudinal mid section of a modified form of the invention, a fragment of hose being also shown and said hose being partly in section.

Fig. 4 is a sectional elevation on line indicated by $x^4$—$x^4$, Fig. 3.

There is provided a tubular member 1 forming a nipple and having screw-threads 2 at one end for connection with the compressed fluid supply line or to a fluid-operated tool such, for example, as a pneumatic riveter, hammer, or drill. The member 1 is also adapted for connection with a hose 3 which is slipped over the member 1 as clearly shown in the drawings.

The member 1 is provided with one or more longitudinally extending slots 4, for example, four as shown in the drawings. Pivoted in the slots 4 by pivots 5 are hose-engaging members in the form of dogs 6 having their outer ends more or less pointed as indicated at 7. The dogs are so constructed and mounted that when they are turned into alinement with the slots 4 they will not project beyond the periphery of the member 1.

Slidably fitting inside of the member 1 is a pressure-operated member in the form of a bushing 8 adapted to be moved by pressure of the fluid passing through the member 1 in the direction of flow of said fluid.

If desired, the bushing 8 may have the edge, that is turned in the direction from which the fluid flows, beveled as indicated at 9 so as to maximize the area of the face upon which the fluid acts to move the bushing.

Now referring more particularly to the form of the invention shown in Figs. 1 and 2, the bushing 8 is adapted to engage the outer faces 10 of the inner ends of the dogs 6, said outer faces extending aslant relatively to the longitudinal axis of the bushing. The end of the bushing 8 which engages the dogs is provided with an internal tapered face 11 so that the dog-engaging end of the bushing forms a wedge adapted to wedge between the slots 4 and the dogs 10 to force the inner ends of said dogs inwardly to thereby move the outer ends of said dogs outwardly into engagement with the hose 3. The dogs 10 penetrate or press into the hose 3 to a slight depth so that forcing of the hose from the member 1 in a direction opposite to the flow of fluid through the hose and member 1 is impossible.

In the form of the invention shown in Figs. 1 and 2, when the dogs 10 are in alinement with the slots in their retracted position so as not to engage the hose 3, the inner ends of the dogs will project very slightly inwardly beyond the inner face of the member 1 in order that, when the bushing 8 is propelled by the fluid in the direction of the arrow $a$ in Fig. 1, the forward end of the bushing will wedge between the dogs and the member 1 to force the outer ends of the dogs outwardly into the hose 3.

With the form of the invention shown in Figs. 1 and 2 it may be assumed that the member 1 is screw-threaded into the machine which is to be operated by the fluid or into any member or body which is to be supplied with fluid under pressure, and that the hose 3 extends to a suitable source of supply of said fluid. Thus the flow of the fluid will be in the direction of the arrow $a$ so as to propel the bushing 8 in the appropriate direction to turn the inner ends of the dogs 10 in the direction of flow of the fluid. In some instances it is desirable that the inner ends of the dogs 10 be turned in a direction opposite to that of the flow of the fluid and to provide for this a construction such as that shown in Figs. 3 and 4 may be employed.

Now referring more particularly to Figs. 3 and 4 the dogs 6, besides being entirely accommodated in the slots 4 when in hose-disengaging position, are so constructed that when they are in hose-engaging position the inner ends of said dogs do not project inwardly beyond the inner face of the member 1, thus allowing the bushing 8 to slide past the dogs 6 so as to engage the inner ends of dog-operating members in the form of levers 12 which are pivoted at 13 in the slot 4. The outer ends of the levers 12 are adapted to engage the slanting faces 10 of the inner ends of the dogs 6 so as to move the inner ends of the dogs 6 inwardly to cause the outer ends of said dogs to penetrate or engage the hose 3 and thus prevent the hose 3 from being forced off of the member 1 by pressure of the operating fluid passing through said member and through the hose. When the dogs 6 are forced into engagement with the hose by pressure of the levers 12 upon the dogs 6, the inner ends of said levers project inwardly sufficiently far to prevent the bushing 8 from being propelled past the levers, the inner ends of said levers catching and holding the bushing.

With the form of the invention shown in Figs. 3 and 5 the member 1 is adapted to be screw-threaded into, or connected by a pipe line to, the source of fluid supply and the hose 3 is connected to the riveter or other machine to be driven by the fluid. It may be assumed, for example, that the fragments of hose shown in Figs. 1 and 3 are parts of the same hose and that the direction of flow of the fluid in Fig. 3 is the same as in Fig. 1 as indicated by the arrows designated $a$. In Fig. 3 the pressure of the fluid moves the bushing 8 to the left the same as in Fig. 1.

In practice, the hose 3 will be slipped over the member 1 while the dogs 10 are retracted in the slots 4 and then the fluid will be turned on so as to discharge through the member 1 to operate the bushing in the manner described above, so as to move the dogs 6 into engagement with the hose and thus prevent the hose from being blown or pulled off of the member 1.

If two pieces or sections of hose are to be connected together the form of coupling shown in Fig. 1 may be connected by a union, not shown, to the form of coupling shown in Fig. 3 or, if desired, the two coupling members 1 may be formed integral with each other.

It is understood that the invention is not limited to the exact details of construction shown in the drawing and described above, but that the invention also includes such changes and modifications as lie within the spirit and scope of the appended claims.

I claim:

1. In a hose coupling, a tubular member adapted to be inserted in a hose, and means operative by fluid pressure in the tubular member to engage the hose.

2. In a hose coupling, a tubular member adapted to be inserted in a hose, a fluid-pressure operated member movably mounted in the tubular member, and means operative by movement of the fluid-pressure operated member to engage the hose.

3. In a hose coupling, a tubular member adapted to be inserted in a hose, dogs movably mounted in the tubular member, and means operative by fluid pressure in the tubular member to force the dogs into engagement with the hose.

4. In a hose coupling, a tubular member adapted to be inserted in a hose, a bushing slidable in the tubular member, and means operative by movement of the bushing to engage the hose.

5. In a hose coupling, a tubular member adapted to be inserted in a hose, dogs movably mounted in the tubular member, and a bushing slidable in the tubular member and adapted to engage the dogs to force the dogs against the inner face of the hose.

6. In a hose coupling, a tubular member adapted to be inserted in a hose and provided with slots, dogs pivotally mounted in the slots, and means operative by fluid pressure in the tubular member to engage one end of the dogs to turn the other end of said dogs into engagement with the hose.

7. In a hose coupling, a tubular member adapted to be inserted in a hose and provided with slots, dogs pivotally mounted in the slots, and a bushing movably mounted in the tubular member and adapted to engage one end of the dogs to turn the other end of said dogs into engagement with the hose.

8. In a hose coupling, a tubular member adapted to be inserted in a hose, hose-engaging means movably mounted in the tubular member, and wedge means to force the hose-engaging means into engagement with the hose.

9. In a hose coupling, a tubular member adapted to be inserted in a hose, dogs pivotally mounted in the tubular member and having outer slanting faces at one end, and a bushing movably mounted in the tubular member and having an internal slanting face at one end adapted to engage the slanting faces of the dogs.

10. In a hose coupling, a tubular member adapted to be inserted in a hose and provided with slots, dogs pivotally mounted in the slots, means movable inside of the tubular member by fluid pressure, and means engagable by the fluid-pressure operated means to move one end of the dogs inwardly.

11. In a hose coupling, a tubular member adapted to be inserted in a hose and provided with slots, dogs pivotally mounted in the slots, a bushing movable inside of the tubular member by fluid pressure, and levers pivoted in the slots and having one end in the path of travel of the bushing and the other end engagable with one end of the dogs.

12. In a hose coupling, a tubular member having slots and adapted to be engaged by a hose, hose-engaging members movably mounted in the slots, and means to force said hose-engaging members against the hose.

13. In a hose coupling, a tubular member having slots and adapted to be inserted in a hose, hose-engaging members movably mounted in the slots, and means to force said hose-engaging members outwardly against the inner face of the hose.

14. In a hose coupling, a member engagable by a hose, members movably mounted in the first-named member, and means to force the movable members against the hose to hold said first-named member, and hose assembled.

Signed at Los Angeles, California, this 27th day of June, 1919.

WILLIAM E. SANDERSON.

Witnesses:
GEORGE H. HILES,
L. BELLE WEAVER.